United States Patent Office 3,396,668
Patented Aug. 13, 1968

3,396,668
ROTARY DEVICES
Jorgen Frederik Waldorff, Nordborg, Denmark, assignor to Danfoss A/S, Nordborg, Denmark, a company of Denmark
Filed Nov. 22, 1966, Ser. No. 596,222
Claims priority, application Germany, Nov. 23, 1965, D 48,732
3 Claims. (Cl. 103—131)

ABSTRACT OF THE DISCLOSURE

Rotary devices in which chambers are defined by spur external gears mounted in spur internal gears, which rotary devices typically may be used as hydraulic pumps or hydraulically driven motors, one of the types of gears being guided so that the center of gravity thereof rotates about the fixed center of gravity of the other type of gears, the so-guided gears being a plurality $n$ in number and being angularly displaced from one another by $360°/n$.

---

This invention relates to rotary devices which, typically, may be used as pumps or motors and which comprise an internally toothed ring or spur internal gear, an externally toothed gear on spur external gear with a number of teeth smaller than that of the spur internal gear, a hollow articulated shaft which is coupled with one of the two toothed elements and permits the center of gravity of this toothed element to execute a movement about the fixed center of gravity of the other toothed element, and a main shaft coupled with the other toothed element, the main shaft being driven by an external power source, such as an electric motor, when the rotary device is to function as a pump, or being driven internally by liquid delivered to the rotary device, when the rotary device is to function as an engine. More particularly, this invention relates to an improvement in rotary devices of the structures described in my copending U.S. application Ser. No. 564,680, filed July 12, 1966, and in German Patent No. 1,198,750.

In the rotary devices upon which the present invention improves, a single fixed (i.e., non-rotatably mounted) spur internal gear is employed in conjunction with a single spur external gear coupled to the main shaft by means of the hollow shaft. These rotary devices have proved satisfactory especially for slow running. However, at higher running speeds a degree of unbalance detrimental to satisfactory operation is experienced, due to the eccentrically revolving toothed element. Besides, efficiency is also limited. To improve the efficiency by increasing speed is not permissible in view of the above mentioned reason. To improve efficiency by enlarging the chambers between the toothed elements has proved difficult because the distribution valve means described in the copending U.S. application cannot easily process larger amounts of fluid.

The present invention, therefore, has as its major object the improvement of rotary devices of the type referred to in such a way that they may also run at higher speeds and/or operate with increased efficiency.

The invention is characterized essentially in that rather than a single toothed element, the center of gravity of which revolves about the center of gravity of the other toothed element, there is provided a plurality $n$ of such toothed elements and that these toothed elements are displaced relatively to one another by an angle of $360°/n$, $n$ being an integer at least equal to 2. It is convenient to provide a like plurality of the other toothed elements, which, however, are not angularly displaced relative to one another.

When such a plurality of mutually displaced toothed elements is provided it is found that a statically balanced construction without static unbalance is achieved. This arrangement provides high-performance rotary devices in which the chambers between the teeth may be kept so small that the operations of charging and discharging can be performed by the distribution valve means without difficulty.

Another advantage of the rotary devices constructed in this way is that the need for multiplying all the component parts is avoided. For example, it is possible to arrange the distribution valve means between two pairs of toothed elements with at least one component of the distribution valve means common to both. It also becomes possible to link two eccentrically revolvable toothed elements displaced by 180° according to the present invention by means of a common hollow shaft.

The invention will now be described in further detail by reference to the drawings which illustrate two embodiments and in which.

Figure 1:
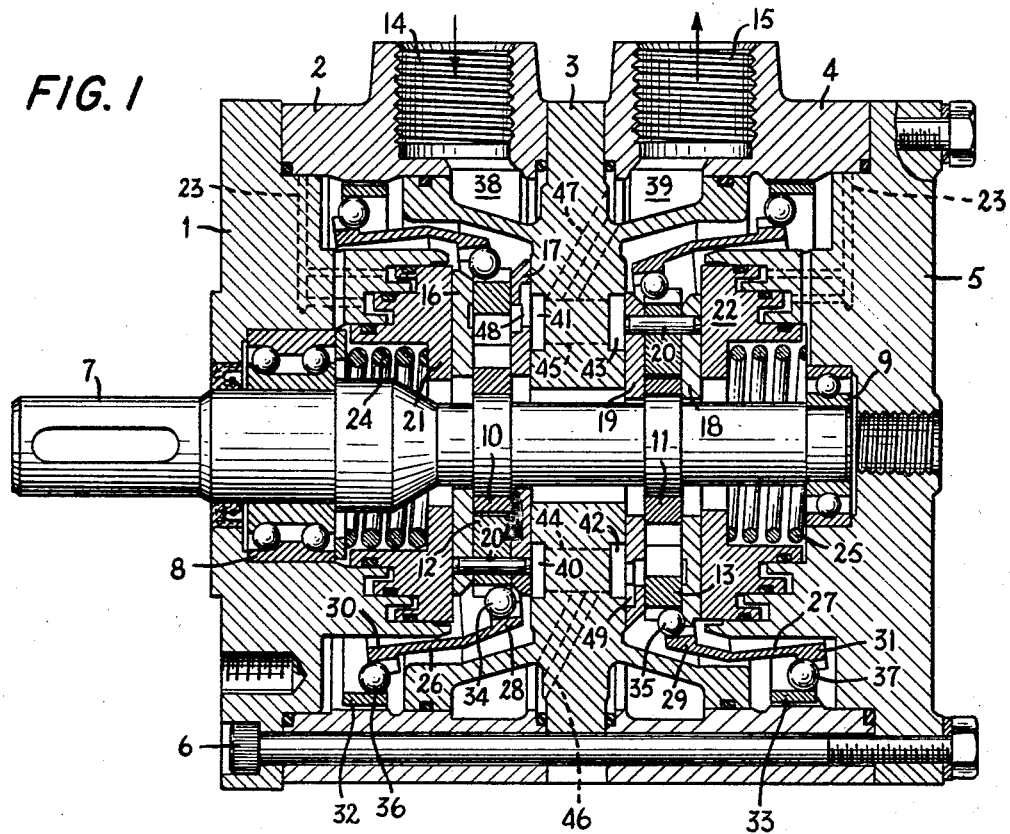
FIG. 1 is, in longitudinal section, a first embodiment of the invention.

The housing or casing of the rotary device consists of five components in concentrically juxtaposed arrangement, namely, a first end plate 1, a first ring 2, a stationary valve part or member 3, a second ring 4 and a second end plate 5 which are all connected to one another by means of bolts 6. A main shaft 7 is supported in the end plate 1 by means of a first ball bearing 8 and in the end plate 5 by means of a second ball bearing 9 and supports on either side of the center of the stationary valve part 3 two identical spur external gears 10, 11. These gears are each surrounded by one spur internal gear, 12 and 13 respectively, each of which is provided with one more tooth than the spur external gears 10, 11. Between the teeth of each of the pairs of toothed elements 10, 12 and 11, 13, a set of fluid-displacement cells or chambers are formed which, in operation, communicate alternately with a liquid inlet port 14 in the ring 2 and a liquid outlet port 15 in the ring 4. The functions of these two ports may, of course, be reversed. Laterally each set of the chambers is sealed off by two plates 16, 17 and 18, 19, respectively, which are positively connected to the associated spur internal gear, 12 or 13 respectively, by means of pins 20. The plates 17 and 19 constitute rotatable valve parts or members which cooperate with the stationary valve member 3. The tightness of the fluid-displacement cells is ensured by the provision of two pistons or plungers 21, 22, a respective one being positioned on each side of the assembly and each having the hydraulic pressure of the system applied to it via channels 23 so that the elements 10, 12, 16, 17 constituting one sub-assembly and the elements 11, 13, 18, 19 constituting another sub-assembly respectively are urged against one another and against the lateral faces of the stationary valve part 3. This effect is aided by the two springs 24, 25, especially during start-up of the rotary device before the full hydraulic pressure of the system is established.

When the spur external gears 10, 11 rotate by one pitch, the center of gravity of each of the associated spur internal gears 12, 13 must at the same time perform an eccentric movement about the center of gravity of the respective spur external gear 10, 11 without, however, executing a rotation of its own. To make this possible, two hollow articulated shafts 26, 27 are provided which, at their respective heads 28 and 29 are provided with an internal toothing and, at their respective other heads 30 and 31 are provided with an external toothing. The internal toothing provided on the heads 28, 29 faces external toothing provided on the spur internal gears 12, 13, and the external toothing provided on the heads 30, 31 faces internal toothing provided in fixed toothed rings 32, 33. Between associated toothings are placed balls 34, 35, 36 and 37, assembled in a cage in each case. Such a cage may be a simple wire ring, for example, engaging axial bores provided through each ball. The configuration of the facing toothings and the arrangement of the balls therein are as described in the above referred to copending application. The head 28 of the articulated shaft 26, which envelops the toothed ring 12, is deflected in a direction opposite to that in which the head 29 of the articulated shaft 27, which envelops the toothed ring 13, is deflected because the toothed rings 12 and 13 are mounted at a displacement relative to one another of 180°.

The inlet port 14 communicates with an annular space 38 and the outlet port 15 with an annular space 39. On each end face of the stationary valve part 3 are provided pairs of substantially radially extending grooves 40, 41 and 42, 43, respectively, which communicate alternately with the inlet port 14 and the outlet port 15. The opposing grooves 40, 42 communicate with one another through bores 44 and the opposing grooves 41, 43 communicate with one another through bores 45. The bores 44 communicate by way of bores 46 with the annular space 38, and the bores 45 communicate by way of bores 47 with the annular space 39. The number of radial grooves 40, 41 and 42, 43 respectively on each end face is twice the number of teeth on each of the toothed rings 10, 11. On the plate 17 are provided single radial grooves 48 and on the plate 19 single radial grooves 49, the number of which in each case corresponds to the number of teeth of the respective associated spur internal gear 12, 13 and each of which communicates with the gap between a respective adjacent two of the teeth of the respective spur internal gear 12, 13. As regards the detailed construction and the operation of this type of distribution valve means reference is made to my copending U.S. application Ser. No. 532,355, filed Mar. 7, 1966.

Figure 2:
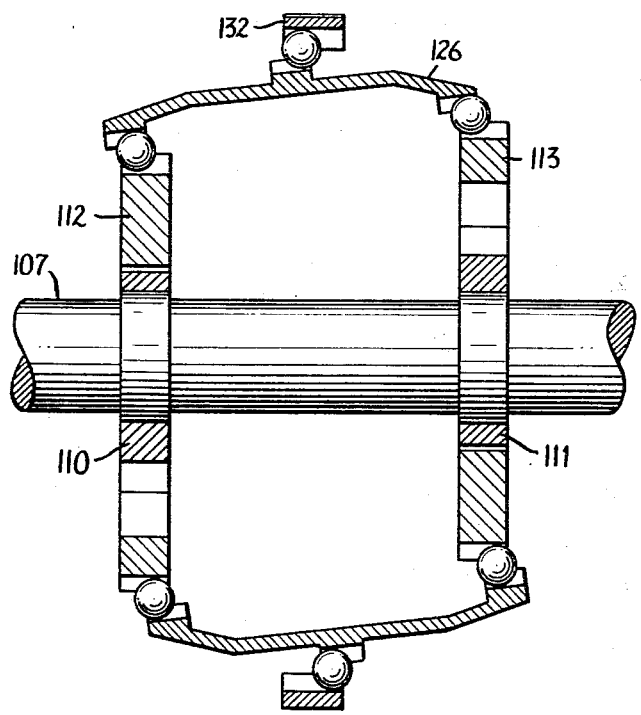
FIG. 2 is, in longitudinal section, a second embodiment of the invention.

In the embodiment of FIGURE 2 only the chief moving parts have been illustrated. They are main shaft 107 to which spur external gears 110 and 111 are fixed, spur internal gears 112, 113 and a common hollow articulated shaft 126 for the spur internal gears 112, 113. Of the fixed components a single ring 132 is shown which supports the hollow shaft 126. As in FIGURE 1, the connection between the toothed rings and the hollow shaft, as well as between the hollow shaft and the supporting ring, is by balls assembled in cages, these assemblies being placed between mutually facing toothings.

Otherwise, the rotary device of FIGURE 2 may be constructed like the rotary device of FIGURE 1. The hollow articulated shaft 126 may be perforated in one or more places, to allow the stationary valve part 3 to be fixed to the housing and the ports to communicate with the interior of the device. However, it is alternatively possible to provide two separate distribution valve means of the type described on the outer end faces of the pairs of toothed elements and to provide a counterabutment which rotates together with the main shaft 107.

While the invention has been described in detail by reference to particular embodiments thereof, it is to be understood that it is not intended thereby to limit the scope of the invention. Modifications and variations within the spirit of the invention are intended to be included within the scope thereof as defined by the appended claims. For example, the basic concept of the invention may also be applied to other rotary devices of the type referred to, for example to those in which a fixed spur internal gear is employed within which a spur external gear revolves which is linked to the main shaft by means of an articulated shaft. The application of the basic concept of this invention to these rotary devices would, of course, involve the use of $n$ spur external gears, displaced relatively to one another by an angle of $360°/n$.

What I claim and desire to secure by Letters Patent is:

1. A rotary device suitable for use as a motor or a pump, comprising a casing, mounted in the casing at least two spur internal gears, a spur external gear positioned in each of the spur internal gears, the spaces between the teeth of each spur internal gear and of the associated spur external gear together defining chambers, a rotatable shaft mounting one of said types of gears, at least one non-rotatable shaft operatively connecting the other of said types of gears to the rotatable shaft, means permitting the center of gravity of said other gears to rotate about the fixed center of gravity of the gears mounted on the rotatable shaft, means communicating between the exterior of the casing and the chambers for the introduction of a liquid to the chambers and means communicating between the chambers and the exterior of the casing for the delivery of the liquid from the chambers to the exterior of the casing, said other gears being angularly displaced from one another by 360° divided by the number of said other gears.

2. A rotary device according to claim 1, in which said spur internal gears and spur external gears are each two in number and those gears which are operatively connected to the rotatable shaft by the non-rotatable shaft are, accordingly, angularly displaced from one another by 180°.

3. A rotary device according to claim 2, further comprising distribution valve means interposed in the means communicating between the exterior of the casing and the chambers for the introduction of a liquid to the chambers, said distribution valve means including a single fixed valve member associated with both of said spur internal and spur external gears and two rotatable valve members, each of said rotatable valve members being associated with a respective spur external gear positioned in a spur internal gear.

References Cited
UNITED STATES PATENTS

| | | |
|---|---|---|
| 1,968,113 | 7/1934 | Weaver. |
| 2,189,976 | 2/1940 | De Lavaud. |
| 2,223,070 | 11/1940 | Kleckner. |
| 2,989,951 | 6/1961 | Charlson _____ 103—131 |
| 3,106,163 | 10/1963 | Mosbacher. |
| 3,215,043 | 11/1965 | Huber _____ 91—56 |
| 3,291,062 | 12/1966 | Hermary. |

FRED C. MATTERN, Jr., *Primary Examiner.*

WILBUR J. GOODLIN, *Assistant Examiner.*